Oct. 16, 1945.  C. A. JOHNSON  2,387,076
MOTORCYCLE FLUID DRIVE
Filed May 5, 1943  2 Sheets-Sheet 1

INVENTOR,
Carle A. Johnson.
BY
Victor J. Evans & Co.
ATTORNEYS

Oct. 16, 1945.   C. A. JOHNSON   2,387,076
MOTORCYCLE FLUID DRIVE
Filed May 5, 1943   2 Sheets-Sheet 2
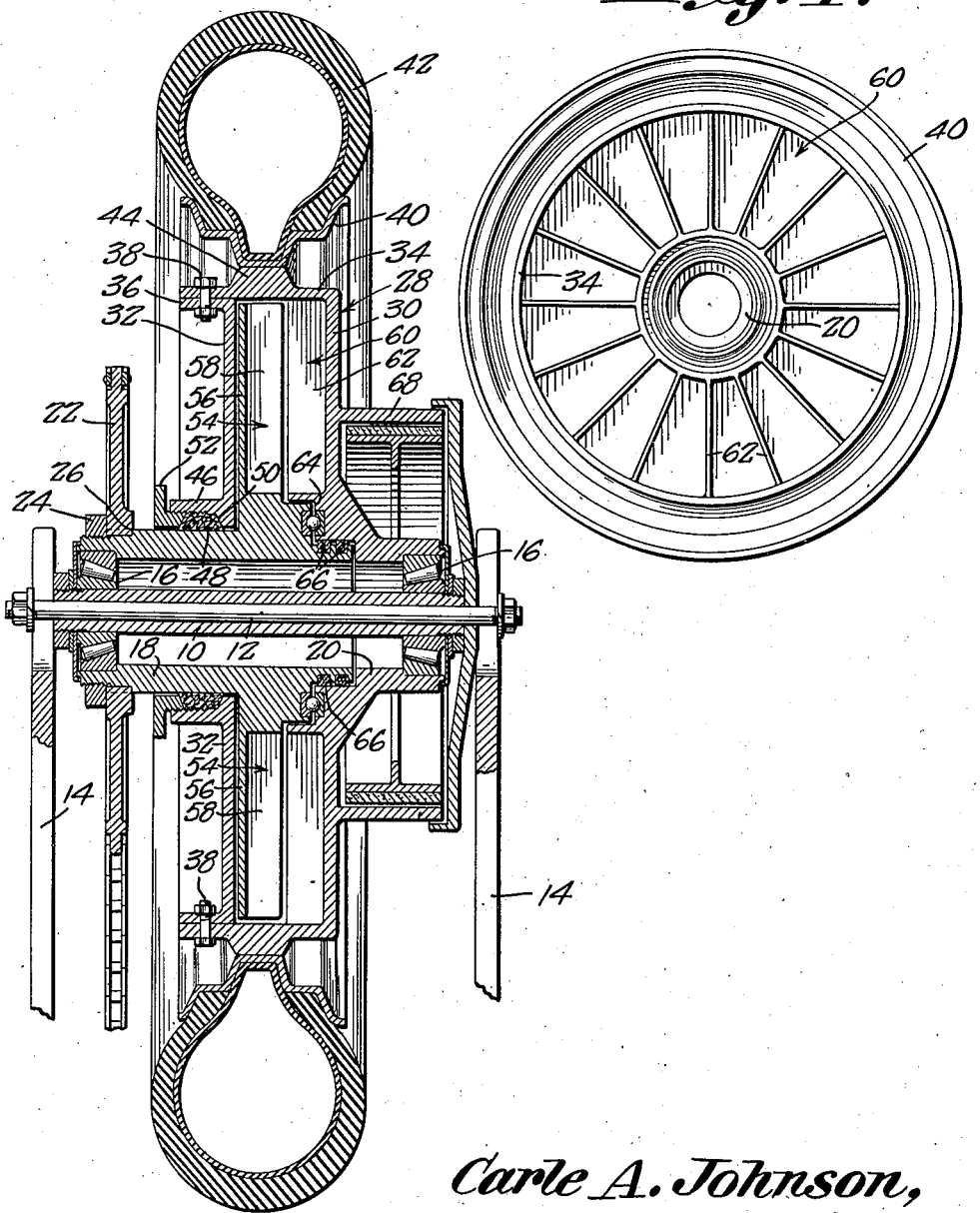
Carle A. Johnson,
INVENTOR.
BY
Victor J. Evans & Co.
ATTORNEYS Patented Oct. 16, 1945

2,387,076

UNITED STATES PATENT OFFICE 2,387,076

MOTORCYCLE FLUID DRIVE

Carle A. Johnson, Laconia, N. H.

Application May 5, 1943, Serial No. 485,775

3 Claims. (Cl. 180—33)

My invention relates to motorcycles, and includes among its objects and advantages the provision of an improved fluid drive or coupling of relatively simple and durable construction adapted to be incorporated in the rear wheel hub structure without necessitating changes in the motor or alteration in its installation.

Motorcycles are difficult to handle in slow speeds and in congested traffic because of their tendency to ride unevenly and also because of necessary shifting. Chains are frequently broken and the motor is often excessively loaded.

The present invention eliminates the necessity of shifting under variable and difficult slow speed traffic conditions, prevents damage to the chain and eliminates excessive loads on the motor, in addition to giving the vehicle smoother riding qualities.

In the accompanying drawings:

Figure 2 is a sectional view through the wheel and its hub structure.

Figure 4 is a face view of the runner coacting with the impeller.

Figure 1:
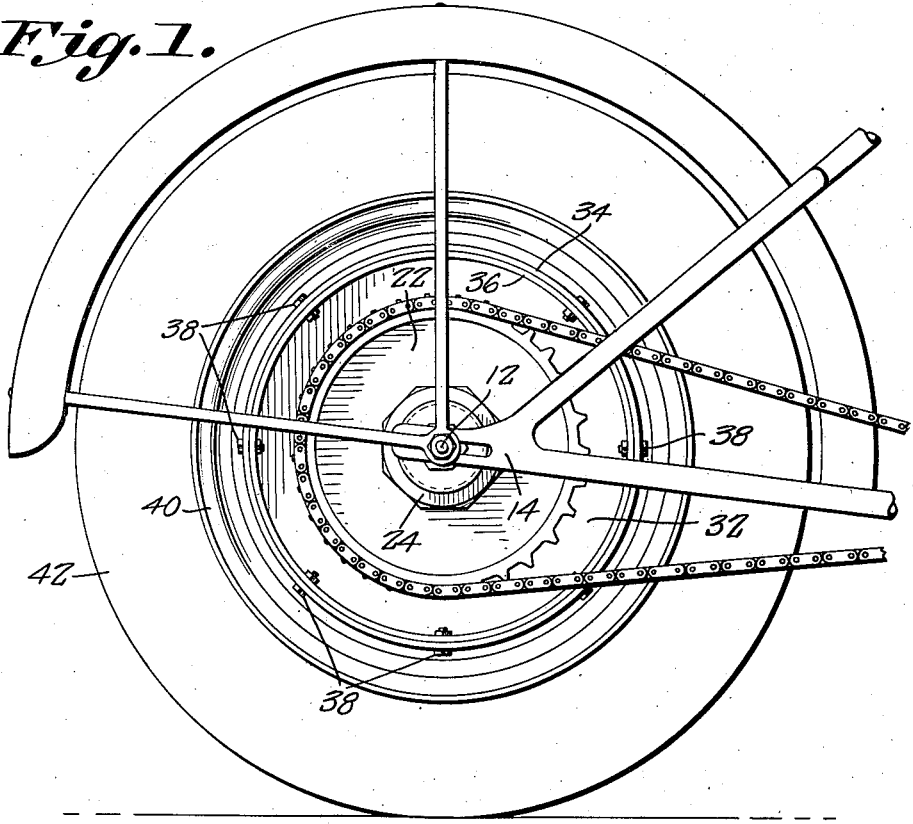
Figure 1 is a side view of the rear wheel of a motor cycle showing my invention incorporated therein.
Figure 3:
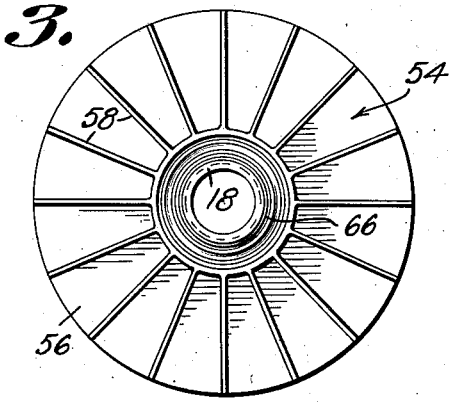
Figure 3 is a face view of an impeller.

In the embodiment of the invention selected for illustration, I make use of a tubular axle 10 through which is extended a bolt 12 which serves as a mount for the frame members 14. Upon the axle 10 are mounted two tapered bearings 16 which rotatably support coaxial hub parts 18 and 20 of tubular formation. The chain sprocket 22 is mounted on the hub part 18 and fixed thereto by a nut 24 threaded on the hub part to clamp the sprocket against a shoulder 26 formed on the hub part.

A fluid drive housing 28 is carried by the hub part 20. This housing comprises sections 30 and 32, the section 30 and the hub part 20 being of one-piece construction. An annular flange 34 defines the perimeter of the plate section 30, while the section 32 includes an annular flange 36 fitted inside the flange 34 and fixed thereto by bolts 38. A rim 40 for supporting the tire 42 is welded to a rib 44 formed on the flange 34.

The section 32 is provided with an annular flange 46 arranged coaxially with the hub part 18 but of larger diameter to accommodate a seal 48 lying against an angular face 50 on the section 32. This seal is maintained in sealing engagement with the hub part 18 and the flange 46 by a pressure nut 52 threaded into the flange 46.

To the hub part 18 is fixedly connected an impeller 54 comprising a plate or disk 56 formed integrally with the hub part and provided with radial vanes 58 attached edgewise to the plate 56 and endwise to the hub part 18. To the section 28 is connected a runner 60 comprising vanes 62 attached edgewise and endwise to the section 28 and endwise to the hub part 20. A thrust bearing 64 is interposed between the hub parts 18 and 20 to maintain the two sets of vanes 58 and 62 in proper spaced relationship for efficient coaction with respect to the liquid contained in the housing 28. Seals 66 are also interposed between the hub parts 18 and 20 to prevent leakage of liquid from the housing.

A brake drum 68 is formed integrally with the section 30, the brake structure being old and forming no part of the present invention, with the exception of the association of the brake drum with the housing 28.

Without further elaboration, the foregoing will so fully explain my invention, that others may, by applying current knowledge, readily adapt the same for use under various conditions of service.

I claim:

1. In a motorcycle drive wheel, the combination of first and second hub parts, means supporting the hub parts for coaxial relative rotary movement, a driving means for the first hub part, a tire mounted on said second hub part, a fluid coupling operatively connecting the first and second hub parts, a frame mount extending through said first and second hub parts, and bearings interposed between the hub parts and said frame mount.

2. In a motorcycle drive wheel, the combination of first and second hub parts, means supporting the hub parts for coaxial relative rotary movement, a driving means for the first hub part, a tire mounted on said second hub part, a fluid coupling operatively connecting the first and second hub parts, a frame mount extending through said first and second hub parts, bearings interposed between the hub parts and said frame mount, and a thrust bearing interposed between the first and second hub parts.

3. In a motorcycle drive wheel, the combination of first and second hub parts, means supporting the hub parts for coaxial relative rotary movement, a driving means for the first hub part, a tire mounted on said second hub part, a fluid coupling operatively connecting the first and second hub parts, a frame mount extending through said first and second hub parts, bearings interposed between the hub parts and said frame mount, a thrust bearing interposed between the first and second hub parts, and a sealing means between the first and second hub parts.

CARLE A. JOHNSON.